United States Patent
Harney

(10) Patent No.: US 10,708,298 B2
(45) Date of Patent: Jul. 7, 2020

(54) METHODS AND APPARATUS FOR SYSTEM HAVING DENIAL OF SERVICES (DOS) RESISTANT MULTICAST

(71) Applicant: Axiom, Inc., Columbia, MD (US)

(72) Inventor: Hugh William Harney, Silver Spring, MD (US)

(73) Assignee: Axiom, Inc., Columbia, MD (US)

( * ) Notice: Subject to any disclaimer, the term of this patent is extended or adjusted under 35 U.S.C. 154(b) by 157 days.

(21) Appl. No.: 15/342,549

(22) Filed: Nov. 3, 2016

(65) Prior Publication Data

US 2017/0126734 A1    May 4, 2017

Related U.S. Application Data

(60) Provisional application No. 62/250,301, filed on Nov. 3, 2015.

(51) Int. Cl.
   *H04L 12/18*   (2006.01)
   *H04L 9/08*    (2006.01)
   (Continued)

(52) U.S. Cl.
   CPC ...... *H04L 63/1458* (2013.01); *H04L 12/1877* (2013.01); *H04L 43/16* (2013.01);
   (Continued)

(58) Field of Classification Search
   CPC ....... H04L 63/06; H04L 63/00; H04L 63/065; H04L 63/067; H04L 63/068; H04L 9/0841
   See application file for complete search history.

(56) References Cited

U.S. PATENT DOCUMENTS 6,880,090 B1 *  4/2005  Shawcross ............. H04L 12/18
                                                 709/225
6,941,457 B1 *  9/2005  Gundavelli ........... H04L 9/0841
                                                 380/278

(Continued)

OTHER PUBLICATIONS

Extended European Search Report dated Feb. 18, 2019, for European Patent Application No. 16 862 950.9, filed Nov. 3, 2016, 9 pages.

(Continued)

*Primary Examiner* — Daniel B Potratz
*Assistant Examiner* — D'Arcy Winston Straub
(74) *Attorney, Agent, or Firm* — Cooley LLP

(57) ABSTRACT

In general, some embodiments described herein relate to using agile or dynamic addresses for multicasting that may be difficult or impossible for a malicious actor to predict. Such agile addresses may prevent a malicious actor from attacking a single static multicast address and may prevent the architecture of the multicast network from propagating the attack. Data sent to invalid (e.g., expired, revoked, and/or otherwise depreciated addresses) can be filtered out and dropped from the network. For example, a first group key associated with a first time period can be calculated based on a first shared secret and a second group key associated with a second time period can be calculated based on a second shared secret. At any given time at least one group key can be an accepted group key. When a multicast address includes a currently accepted group key, the data can be sent to a group.

19 Claims, 3 Drawing Sheets

(51) Int. Cl.
  *H04L 29/06* (2006.01)
  *H04L 12/26* (2006.01)
  *H04L 29/12* (2006.01)

(52) U.S. Cl.
  CPC ...... *H04L 61/2053* (2013.01); *H04L 61/2069* (2013.01); *H04L 61/6059* (2013.01); *H04L 63/06* (2013.01); *H04L 63/065* (2013.01); *H04L 63/067* (2013.01); *H04L 63/068* (2013.01); *H04L 63/1416* (2013.01); *H04L 63/1425* (2013.01); *H04L 9/08* (2013.01); *H04L 9/0847* (2013.01); *H04L 12/189* (2013.01)

(56) References Cited

U.S. PATENT DOCUMENTS

| | | | |
|---|---|---|---|
| 8,458,462 B1 | 6/2013 | Hanna | |
| 9,203,798 B2* | 12/2015 | Wright, Sr. | ......... H04L 61/2053 |
| 2004/0123142 A1 | 6/2004 | Dubal et al. | |
| 2007/0016663 A1 | 1/2007 | Weis | |
| 2008/0056295 A1* | 3/2008 | Loda | ....................... H04L 45/10 370/437 |
| 2008/0291017 A1* | 11/2008 | Yermal | ............... H04L 63/1416 340/541 |
| 2011/0188653 A1 | 8/2011 | Yao et al. | |
| 2011/0277032 A1 | 11/2011 | Vargas | |
| 2015/0026363 A1 | 1/2015 | Wright, Sr. | |
| 2015/0236752 A1* | 8/2015 | Cruz | ................... H01L 63/1408 375/135 |

OTHER PUBLICATIONS

Harney, H. et al. (2006). GSAKMP: Group Secure Association Key Management Protocol, Network Working Group, 106 total pages.
International Search Report dated Feb. 2, 2017, for PCT Application No. PCT/US2016/60287, filed Nov. 3, 2016, 2 pages.
Written Opinion of the International Searching Authority dated Feb. 2, 2017, for PCT Application No. PCT/US2016/60287, filed Nov. 3, 2016, 6 pages.

* cited by examiner

METHODS AND APPARATUS FOR SYSTEM HAVING DENIAL OF SERVICES (DOS) RESISTANT MULTICAST

CROSS REFERENCE TO RELATED APPLICATIONS

The present application claims the benefit of provisional U.S. Patent Application No. 62/250,301, filed Nov. 3, 2015 and entitled "Methods and Apparatus for System having Distributed Denial of Service (DDoS) Resistant Multicast" under 35 U.S.C. § 119(e), the disclosure of which is hereby incorporated by reference in its entirety.

BACKGROUND

Some embodiments described herein relate to multicast routing, and denial-of-service (DoS) resistant multicasting.

Multicasting is a communication mechanism in which data is addressed to a group of compute devices (e.g., more than one compute device). A compute device to which multicast data is addressed is referred to herein as a recipient. A multicast address specifies the group of recipients and, optionally, parties that send data to the group of recipients. Routers, upon receiving data that includes a multicast address, can be operable to automatically and/or dynamically produce a multicast distribution tree by which the data is delivered to network segments that are in a path between a source (e.g., a compute device) and the recipients in the group. Such techniques can conserve network resources as compared to unicast or broadcast techniques, particularly when the group includes a large number of recipients. For example, such techniques can exclude routers and/or recipients that are not in a path between the source and the recipients and efficiently duplicate data when necessary to reach multiple recipients.

Known multicasting techniques are particularly vulnerable to DoS attacks. A malicious actor observing traffic over a multicast network can identify a multicast address and direct malicious traffic, which can include malformed packets that include the multicast address. Routers implementing known multicast protocols may pass this malicious traffic to downstream network nodes, which can have the effect of exacerbating the attack.

One known application of multicasting is in overlay hub-and-spoke networks, such as Internet Relay Chat (IRC) or Command and Control (C2) networks. Such networks may be overlaid on the global internet and are prone to failure. The hubs typically manage delivery membership of users and other hubs, so the loss of any spoke or hub can result in an extensive recovery procedure that may require users to "find" a new hub for service. In addition a large amount of retransmission may be required to re-sync the rejoining members. Because, the hubs, spokes, and the multicast addresses used to reach users of such a network are static and detectable by a malicious actor, such networks are vulnerable to DoS attacks, particularly distributed DoS (DDoS) attacks carried out by botnets.

Another application of multicasting is in mesh networks, such as those employed by Internet of Things (IoT) sensors and/or devices. When nodes of such a network receive a signal, they may replicate it to other nearby network nodes. When targeted by a malicious actor, such sensors and/or devices, which may be battery operated and/or have limited computational and/or network resources, may waste precious resources replaying malicious attack packets. A need therefore exists for DoS resistant multicast networks.

DETAILED DESCRIPTION

Figure 1:
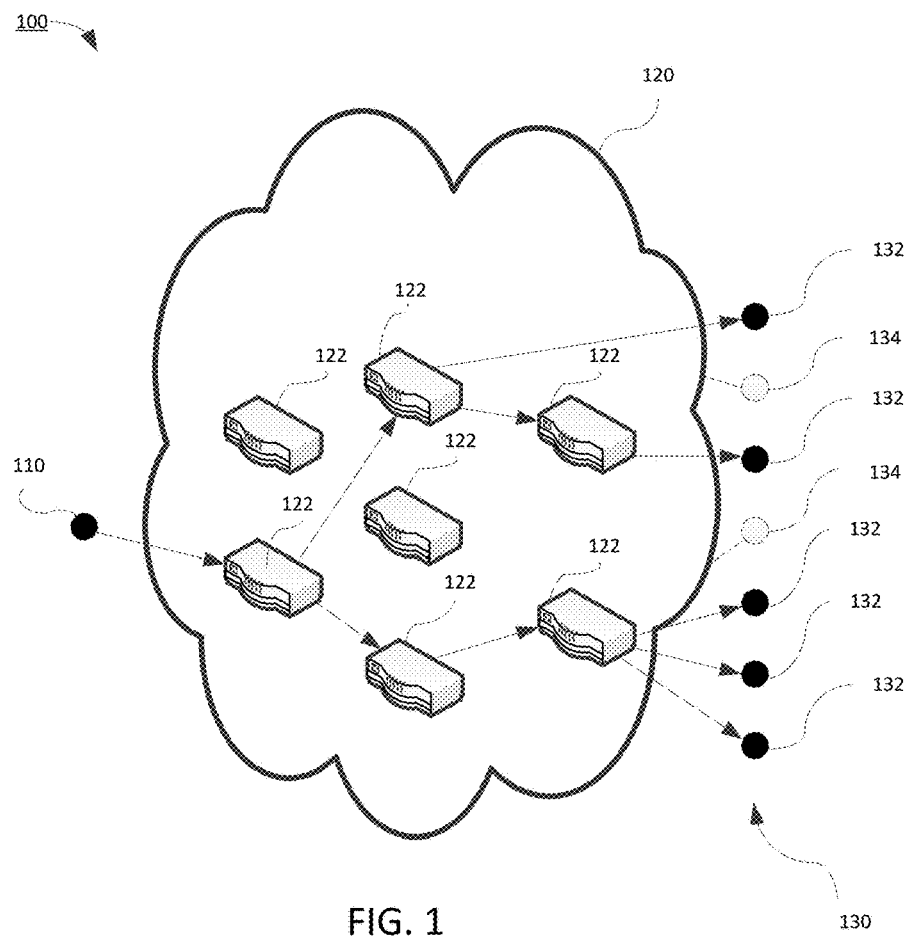
FIG. 1 is a schematic illustration of a multicast network, according to an embodiment.

Some embodiments described herein relate to communication networks suitable for multicasting. Some such communication networks can be overlay networks that overlay on top of other communications networks, such as the internet. Other such communication networks can be mesh networks, such as are employed by Internet of Things (IoT) sensors or devices. Embodiments discussed in the present application are generally described in the context of Internet Protocol (IP) networks and/or addresses, but it should be understood that embodiments described herein can be applied to any suitable multicast environment. For example, rather than being applied at the transport layer, embodiments described herein can be applied at any other suitable layer. For example, techniques described herein can be applied to the application layer using uniform resource locators (URLs) and/or the domain name system (DNS) rather than IP addresses.

In general, some embodiments described herein relate to using agile or dynamic addresses for multicasting that may be difficult or impossible for a malicious actor to predict. Such agile addresses may prevent a malicious actor from attacking a single static multicast address and may prevent the architecture of the multicast network from propagating the attack. Data sent to invalid (e.g., expired, revoked, and/or otherwise depreciated addresses) can be filtered out and dropped from the network. In this way, some embodiments described herein allow data from trusted sources (e.g., trusted source compute devices and/or trusted routers) to be multicast to a group of recipients, while filtering out messages from malicious actors.

Some embodiments described herein relate to an apparatus, such as a router and/or node of a multicast network. The apparatus can include a processor, a memory, an input port configured to receive data, and an output port configured to send data. For example, the apparatus can be a computing entity having a Network Interface Controller (NIC), a cellular telephone radio, and/or any other suitable network access hardware and/or software. The apparatus can be configured to receive, via the input port, a data packet for distribution to a group. The data packet can include a multicast address. The processor can be configured to perform key management functions such periodically calculating group keys. For example, a first group key associated with a first time period can be calculated based on a first shared secret and a second group key associated with a second time period can be calculated based on a second shared secret. At any given time at least one group key can be an accepted group key. The apparatus can be configured to evaluate the data received via the input port and, when a portion of the multicast address matches a value determined based on a currently accepted group key, the data can be sent to a group. Conversely, when data received via the input port includes a multicast address that does not match a value determined based on a currently accepted group key, the data can be dropped and not sent to the group.

Some embodiments describe herein relate to a method of operating a node of a multicast network. Such a method can be a computer-implemented method. The method can include receiving a first data addressed to a first multicast address. The first multicast address can include a first group key that is associated with a first time period. Based on the first time period being less than a threshold number of time periods before the current time, the first data can be forwarded to a group of destination nodes. The method can also include receiving second data addressed to a second multicast address. The second multicast address can include a second group key that is associated with a second time period. The second data can be dropped (and not forwarded to the group of destination nodes) based on the second time period being more than a threshold number of time periods before the current time.

Some embodiments described herein relate to a method of operating a node of a multicast network. The method can include receiving, at a first time, first data for routing to a group. The first data can be sent to the group via a first multicast address that is based, at least in part, on a first group key associated with a first time period and derived from a first shared secret. At a second time, second data to be routed to the group can be received. The second data can be sent to the group via a second multicast address that is different from the first multicast address. The second multicast address can be based, at least in part, on a second group key associated with a second time period and derived from a second shared secret.

FIG. 1 is a schematic illustration of a multicast network 100, according to an embodiment. The multicast network 100 can include a source 110 and recipients 130. The source 110 and the recipients 130 can each be a computing entity (having a memory and a processor). Data sent by the source 110 can be transmitted to members of a multicast group 132 without requiring the source 110 to send a copy for each member of the multicast group 132. In some instances, the source 110 can send only a single copy of the data. Data can be routed from the source 110 to the members of the multicast group 132 while recipients 130 that are not members of the multicast group 132 do not receive the data.

The multicast network 100 includes a network 120 that can connect the source 110 to any number of recipients 130. The network 120 can be, for example, the Internet, an intranet, a local area network (LAN), a wide area network (WAN), a virtual network, a telecommunications network, a mesh network, any other suitable communication system and/or combination of such networks. The network 120 can be implemented as a wired and/or wireless network.

The network 120 can include any number of routers 122. Each router 122 can be a computing entity having a processor, a memory, an input port configured to receive data, and an output port to send data. In some instances, routers 122 can form at least a portion of an overlay network. For example, routers 122 can be connected by logical links (e.g., private links) that physically span the global internet or any other suitable network 120. The routers 122 can each be enabled to multicast messages and/or define multicast routes to members of one or more multicast groups. For example, the routers 122 can be enabled to multicast data, including a multicast address associated with the members of the multicast group 132, to the members of the multicast group 132 without sending such data to recipients 130 who are not members of the multicast group 134 and/or without sending data to routers 122 that are not on a path between the source 110 and the multicast group 132. Other data having a different multicast address associated with a different group can be sent to any suitable combination of recipients 130 via any suitable routers 122. Any of the source 110, routers 122, and recipients 130 can be referred to generically as "nodes."

The routers 122 can each be configured to deliver data to one or more other routers 122 and/or recipients 130. Upon receiving data having a multicast address associated with the members of the multicast group 132, the routers 122 can dynamically produce a multicast distribution tree by which the data can be delivered to members of the multicast group 132 (also referred to herein "destination nodes"). For example, sender 110 can send a single copy of data, and routers 122 can be operable to send copies of data to multiple other routers 122 or members of the multicast group 132. For example, each router 122 can be operable to duplicate to send data to multiple other routers and/or members of the multicast group 132. As discussed in further detail herein, data sent from one node (e.g., the source 110 or a router 122) can include a multicast address. A router 122 receiving the data can use the multicast address to determine to which node(s) (e.g., router(s) 122 and/or recipient(s) 132) to which to forward data.

Known multicast routing schemes, however, are vulnerable to DoS attacks. For example, a malicious actor may be able to monitor traffic on a network (e.g., on the internet) and collect the multicast address. The malicious actor may then be able to send a large volume data, which may be malformed, to the multicast address, which can cause each of the routers to forward the data towards the multicast group, which can include some routers sending more than one copy of data to routers and/or members of the multicast group. Because routers in known multicast systems can duplicate data, such attacks can have a larger impact on multicast schemes than unicast systems. As a result, a DoS attack on a known multicast network can, in some instances, cripple a significant portion of routers capable of sending multicast data to recipients.

Returning to FIG. 1, some embodiments described herein relate to resilient multicast networks that are capable of updating the multicast address, which can reduce the effectiveness of an attack that uses a previously-used (e.g., static) multicast address. For example, some embodiments described herein relate to multicast addresses can expire and data addressed to old multicast addresses can be dropped, rather than being propagated through the multicast network.

In some instances, each multicast address can be based on a shared secret. For example, each router 122 and/or the source 110 can possess and/or store a password, passphrase, list of multicast addresses, etc. Each multicast address may be associated with a limited period of time or "epoch." The routers 122 can be operable to determine the current epoch and drop data that includes a multicast address that is more than a threshold number of epochs old. Similarly stated, each router 122 can be operable to route data to the members of the multicast group 132 if the data is addressed with a multicast address for the current epoch or a multicast address associated with a limited number of previous epochs.

Figure 2:
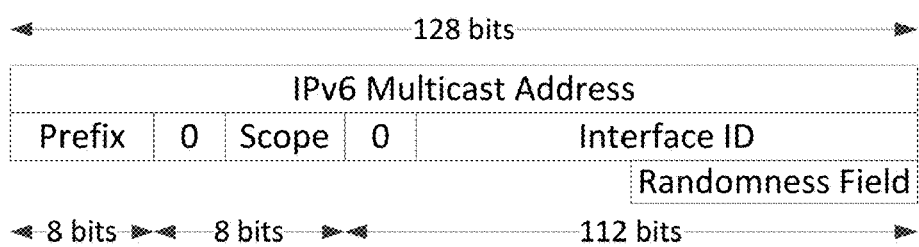
FIG. 2 is an example of a multicast address having a randomness field.

FIG. 2 is an example of a multicast address having a randomness field. The large address space of Internet Protocol version 6 (IPv6) makes it particularly well suited for DoS resistant multicasting. A multicast network operator can reserve a sufficiently large block of multicast addresses such that various multicast addresses can be used and discarded by that multicast network operator. A portion of the multicast address (e.g., the last 24 or 32 bits of the address or any other suitable portion of the interface identifier) can be a randomness field. Nodes of the multicast network (e.g., routers 122) can be operable to analyze the randomness field to determine whether the multicast address is currently accepted and/or valid. Although multicast addresses are generally described herein in the context of IPv6 it should be understood that any suitable addressing scheme can be used. For example, at the uniform resource locator (URL) level, a subdomain, argument, or path can be used as a randomness field.

The randomness field can be filled with a group key. Similarly stated, when assigning a multicast address a node (e.g., a source and/or router) can bind the group key to the randomness field to define a multicast address. In some embodiments, the group key is a portion and/or a hash of an output of a cryptographic function applied to the shared secret and/or a time associated with an epoch. In other embodiments, the group key can be derived from the shared secret using any other suitable technique. For example, the shared secret can be an ordered list of group keys, the shared secret can be hashed along with a time, and so forth. Because the group key may be difficult or impossible for a malicious attacker to predict, having the group key bound to the randomness field can produce a multicast address that appears to be random to entities monitoring network traffic.

In this way, the address for directing data to the members of the multicast group 132 can be periodically and/or automatically updated. Each router 122 can be synchronized to update the multicast address in concert using cryptographic key management protocols, such as those described in The Internet Engineering Task Force (IETF) Request for Comments (RFC) defining Group Secure Association Key Management Protocol (GSAKMP), RFC 4535-GSAKMP: Group Secure Association Key Management Protocol, H. Harney et al., The Internet Society, 2006; the disclosure of which is hereby incorporated by reference in its entirety. Similarly stated, based on the shared secret, each router 122 can independently determine a multicast address for the current epoch and/or the multicast address(es) for one or more previous epoch(s). Each router 122 can determine which multicast address(es) is currently accepted (e.g., the multicast address for the current epoch and, optionally, one or more multicast addresses for previous epochs). Each router 122 can further forward data having an accepted and/or valid multicast address to the next hop in the network and drop data having a depreciated multicast address. Periodically updating the multicast address can frustrate malicious actors' attempts to attack the multicast network. To effectively attack such a multicast network, a malicious actor would need to continuously update the multicast address to which the attack is directed. By changing addresses in an unpredictable manner and/or frequently updating the multicast address, a malicious actor would need to constantly capture multicast addresses and redirect the attack. In the case of distributed DoS attacks, it may be difficult or impossible to coordinate a botnet to keep up with changing multicast addresses, which can reduce or eliminate the effectiveness of the attack and/or increase the resiliency of the multicast network.

In addition, multicast addresses can make use of Logical Key Hierarchies (LKHs) that can allow a single message (or set of messages intended for a single group of recipients) to change which nodes are used to route the message from one node to another. For example, a single multicast group (e.g., including recipients and routers) can be split into multiple multicast groups, or multiple multicast groups can be combined into a single multicast group. In this way, nodes that are compromised by, for example, a DoS attack can be excluded from the network topology, allowing the message to be routed around congested or compromised portions of the network. Similarly, multiple delivery paths could be added for critical message delivery, for example, when an important asset is being attacked. These features can increase the probability of operation in the presence of a DoS attack.

Figure 3:
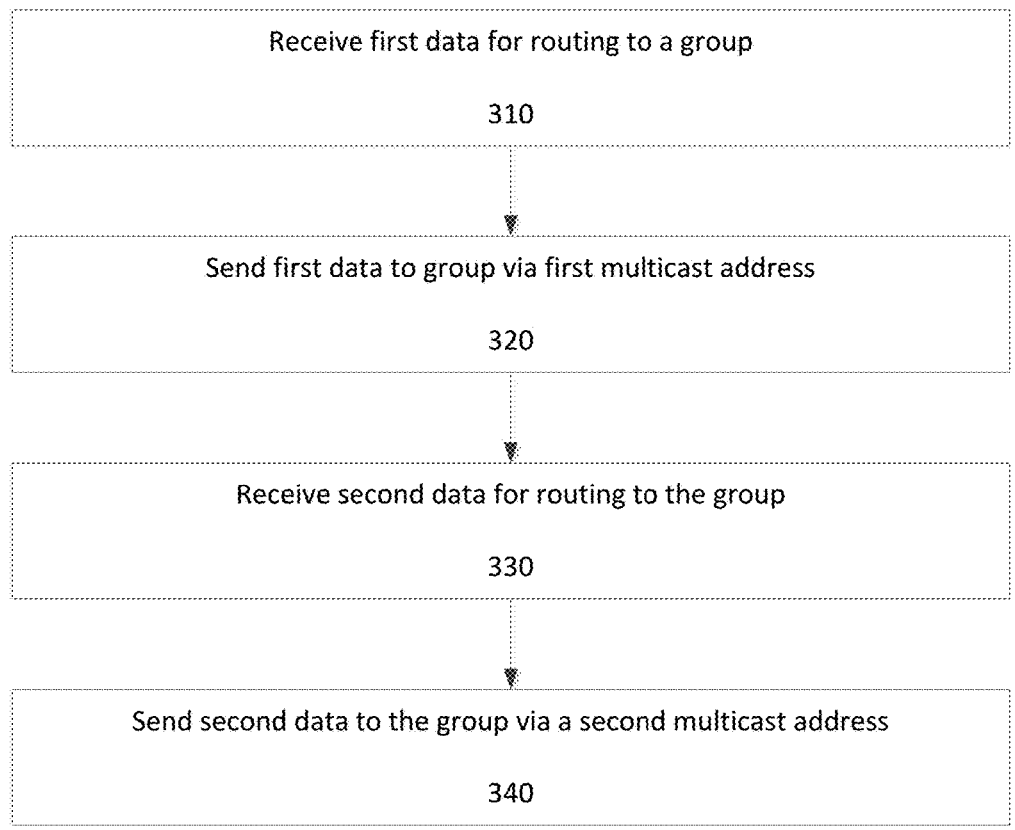
FIG. 3 is a flow chart of a method for operating a node of a multicast network, according to an embodiment.

FIG. 3 is a flow chart of a method for operating a node (e.g., a router, switch, or other suitable network device) of a multicast network, according to an embodiment. A multicast network that includes nodes operating according to the method of FIG. 3 can be resistant to DoS attacks.

At 310, first data can be received for routing to a multicast group. For example, a source, such as source 110 described above with reference to FIG. 1, can send the first data to an edge router, which can be configured to assign a multicast address so that the first data can be routed through the network to a multicast group. In other instances, the first data can include a multicast address. For example, the source can be configured to assign a multicast address to the data and/or at least one router can be disposed between the source and the node that received the first data, at 310.

At 320, the first data can be sent to the multicast group (e.g. directly and/or via intervening nodes) via a first multicast address. The first multicast address can be based, at least in part, on a first group key derived from a shared secret. For example, as discussed above with reference to FIG. 2, a randomness field of the first multicast address can be filled with a group key that is calculated based on a shared secret and, optionally, a first time. The first time can be associated with the original transmission of the first data (e.g., from the source 110). In this way, the first multicast address can be associated with an epoch, which can have a predetermined and/or configurable duration. The first multicast address can expire, be revoked, or otherwise be depreciated when the epoch ends and/or when a predetermined and/or configurable additional number of epochs have elapsed. Similarly stated, nodes of the multicast network can be configured to route the first data towards the multicast group while the first multicast address is accepted and/or valid. For example, each node of a multicast network can store a shared secret that can be used to validate the first multicast address (or a portion thereof).

At 330, second data can be received for routing to the multicast group. In some instances, the second data received, at 330, can be received with a second multicast address. In other instances, after receiving the second data, at 330, a second multicast address can be assigned to the second data.

At 340, the second data can be sent to the multicast group via the second multicast address. The second multicast address can be different from the first multicast address, but the node can be operable to route the second data to the same multicast group to which the first data was sent, at 320. Similarly stated, the multicast address for routing data to the multicast group can be periodically updated. Each updated multicast address (e.g., each updated group key) can be associated with an epoch, and each node (e.g., each router 122 described above with reference to FIG. 1) can be operable to validate multicast addresses and forward data if the multicast address is associated with a current epoch or a predetermined and/or configurable number of previous epochs. For example, if third data that includes the first multicast address is received after the first data is received at 310 and after the first multicast address has been depreciated (e.g., expired and/or revoked), the third data can be dropped even though the first multicast address was used to send the first data to the multicast group, at 320, at an earlier time. In this way, replay attacks and/or attacks developed based on intercepting data that included the first multicast address can be thwarted and/or rendered less effective. As another example, the first multicast address can be revoked by an administrator after the first data is sent to the multicast group at 320 such that future data that includes the first multicast address is dropped.

Figure 4:
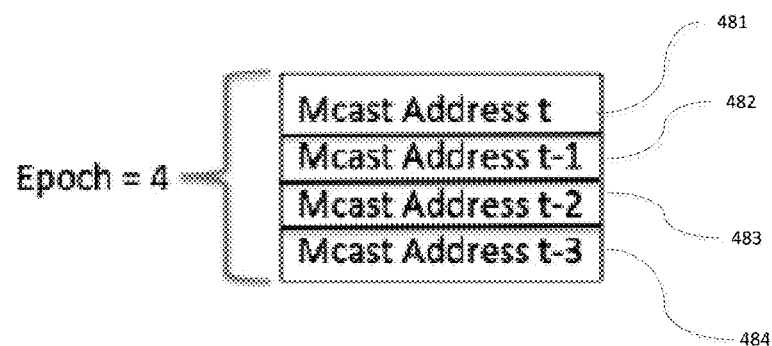
FIG. 4 is an illustration of a representation of a multicast address management policy, according to an embodiment.

FIG. 4 is an illustration of a representation of a multicast address management policy, according to an embodiment. FIG. 4 illustrates a scenario in which four multicast addresses/four epochs are accepted at a particular time, t. Multicast address t 481 represents an accepted multicast address associated with an epoch containing time t. For example, a group key embedded within a randomness field of multicast address t 481 can be calculated based on a shared secret and the epoch containing time t. Multicast address t−1 482 represents another accepted multicast address associated with the epoch immediately preceeding the epoch containing time t. In some instances, the same shared secret can be used to calculate the group key embedded in multicast address t 481 and the group key embedded in or bound to multicast address t−1 482 (optionally in conjunction with time t and time t−1, respectively). In other instances, the group key (or a shared secret used to calculate the group key) embedded within the randomness field of multicast address t−1 482 can be the shared secret based on which multicast address t 481 is calculated. For example, a cryptographic function can be applied to the group key (or a shared secret used to calculate the group key) embedded within the randomness field of multicast address t−1 482 to produce a new pseudorandom value (e.g., a new group key), which can be bound to multicast address t 481.

Similarly, a group key embedded within a randomness field of multicast address t−1 482 can be calculated based on a shared secret and the epoch immediately preceding the epoch containing time t. Similarly multicast address t−2 483 and multicast address t−3 484 can be associated with two epochs prior to the epoch containing time t and three epochs prior to the epoch containing time t, respectively.

In some embodiments, each epoch can have a common predetermined and/or configurable duration. The duration of an epoch can be measured in milliseconds, hours, days, or any other suitable time period. For example, a high value multicast network such as might be used for critical infrastructure, defense, or national security may have very short epochs, such as 10 ms or 100 ms such that the address(es) used to transmit data to the organization evolve and/or are depreciated vary rapidly, perhaps more rapidly than addresses can be harvested and/or analyzed by a malicious actor. In other examples, such as low-volume sensor network, which may be part of the Internet of Things (IoT), epochs may be hours or days long. In such a scenario, nodes, which may have limited computational and power resources, may only report data with a relatively low frequency (e.g., hourly or daily) and power and computational resources can be conserved by less frequent calculations of group keys. In some embodiments, epochs can be mutually exclusive. Similarly stated, each instance of time can belong to exactly one epoch. In other embodiments, epochs can overlap.

Each node of a multicast network can be synchronized using a Network Time Protocol (NTP), external timers (e.g., satellite and/or atomic) accessible to the nodes, and/or pre-synchronized internal timers. In some instances, time is an input of a function used to calculate a group key. For example, in an embodiment where each epoch has a duration of one minute, the number of minutes after midnight and the previous group key can be inputs of a function used to calculate the next group key.

Synchronized updates to the epoch and/or multicast address can be based on a shared secret possessed by each node and/or trusted source using cryptographic key management protocols. Key management protocols can further be used to update the shared secret, de-authorize a node (e.g., in the event a node is compromised or stolen), and/or update the recipients who receive multicast data. For example, key management protocols can be used to split a multicast group of recipients into one or more multicast groups each having a new and different multicast address, update the multicast group to include one or more new members, and/or remove a node and/or recipient from receiving multicast data. For example, nodes (e.g., routers and/or source(s)) can be communicatively coupled to an administrator device that can be operable to send a control signal to one or more nodes (e.g., source(s) and/or router(s)) to cause the node to update and/or replace a shared secret and/or update the recipients who receive multicast data. In some instances, nodes can be configured to propagate such a control signal such that the control signal is multicast to each node to update and/or replace a shared secret and/or update recipients who receive multicast data.

As shown, in the example of FIG. 4, four epochs/multicast addresses are accepted and/or valid. Having multiple epochs/multicast addresses being accepted and/or valid at a particular instant can facilitate a smooth transition between multicast address updates. For example, once one epoch ends, the multicast address associated with that epoch may not immediately be depreciated, rather, in some instances, one or more older addresses associated with previous epochs can continue to be accepted and/or treated as valid. In this way small differences in synchronization between nodes, and data sent near an end of an epoch are less likely to result in packet loss.

Although four epochs/multicast addresses are shown as being accepted and/or valid in FIG. 4, it be understood in other embodiments any other number of epochs/multicast addresses can be accepted and/or valid at any given time. Furthermore, it should be understood that epoch duration and/or number of accepted epochs can be variable and/or configurable. For example, in response to a node detecting a DoS attack (e.g., by observing data having multicast addresses that are depreciated and/or invalid) the node can reduce the number of accepted and/or valid addresses and/or shorten the duration of an epoch. As another example, the epoch duration and/or number of accepted epochs can be configured by an administrator logging into a node and/or sending a control signal to the node via a network. As yet another example, in response to a node detecting a DoS attack and/or receiving a signal from a control device indicating that an attack is occurring, the node can inform neighboring nodes of the attack, which can in turn reduce epoch duration and/or number of accepted epochs. In some such instances the indication of the attack can be propagated through an entire multicast network in this manner (e.g., nodes informing neighboring nodes). In other instances, a single node or portion of the multicast network can operate with shorter epochs and/or fewer accepted keys than other nodes and/or portions of the network.

Figure 5:
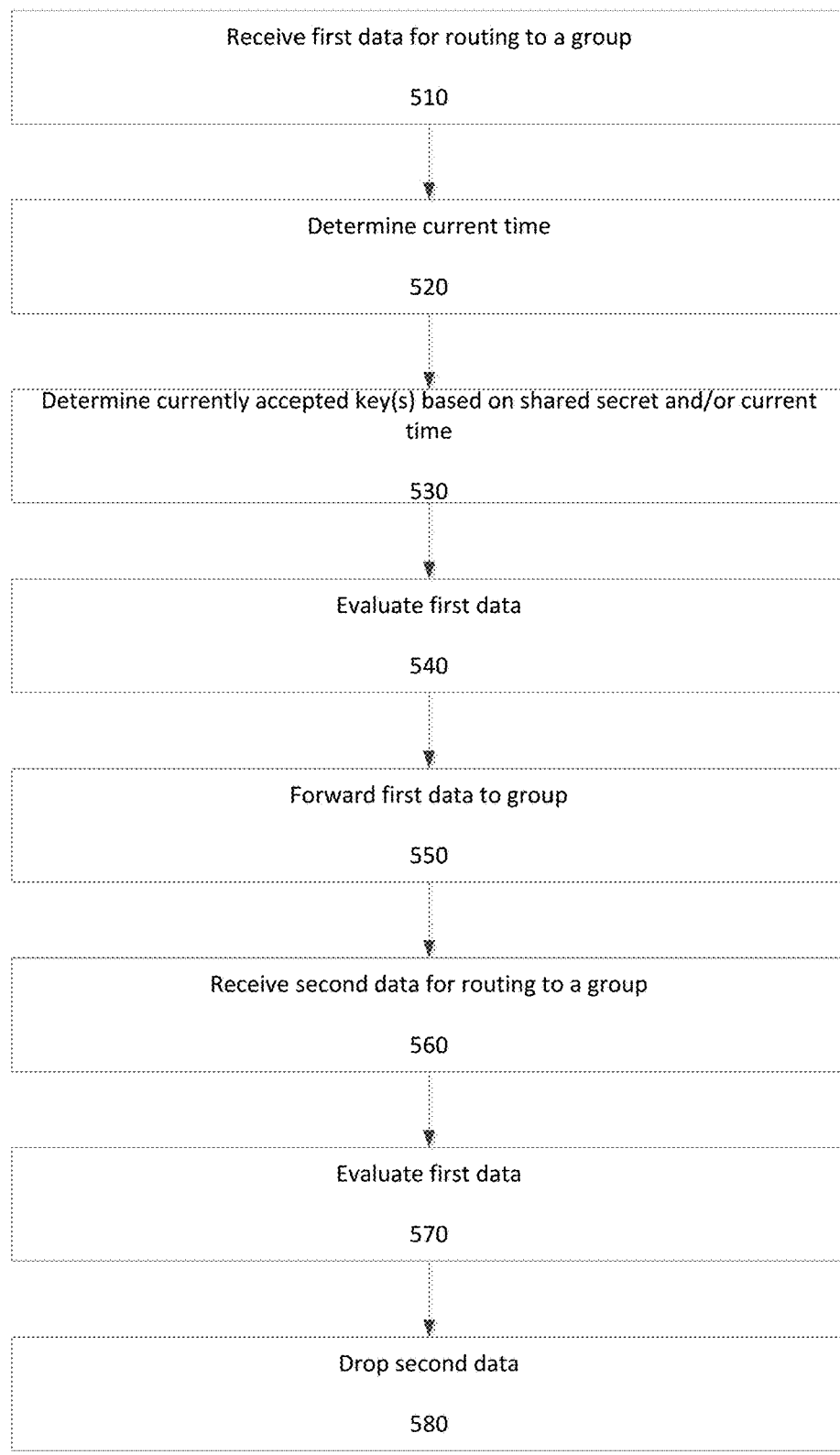
FIG. 5 is a flow chart of a method for operating a node of a multicast network, according to an embodiment.

FIG. 5 is a flow chart of a method for operating a node (e.g., a router, switch, or other suitable network device) of a multicast network, according to an embodiment. A multicast network that includes nodes operating the method of FIG. 5 can be resistant to DoS attacks.

At 510, first data for routing to a multicast group can be received from, for example, the source 110 or a router 122 as described above in reference to FIG. 1. The first data can include a first multicast address similar to the multicast address described above with reference to FIG. 2. The node can be operable to determine a current time, at 520, and determine what multicast address(es) are currently accepted and/or valid, at 530. For example, the node can store a shared secret in memory and be operable to a calculate group key(s). For example, at the start of each epoch or at any other suitable time, each node can be operable to perform a calculation (e.g., a cryptographic calculation) on a shared secret to produce an accepted valid group key for that epoch. Each node can be configured to manage which group key(s) are currently accepted and/or valid based on the current time. For example, each node can be operable to determine that a group key associated with the epoch containing the current time and group key(s) associated with one or more previous epochs are accepted and/or valid. In addition or alternatively, each node can maintain a table (e.g., a routing table or a forwarding table) that indicates a destination and/or next hop for valid multicast addresses. As multicast addresses become depreciated (e.g., expire and/or are revoked), they may fall off the table. As described in further detail herein, when data that includes a multicast address that is not on the table is received (e.g., when there is no valid route and/or destination), the data can be dropped.

At 540, the first data can be evaluated. For example, the node can determine, based on the first multicast address, whether the first data should be sent towards a group of recipients. In some embodiments, the node can consult a table (e.g., a routing table or forwarding table) to determine whether a destination and/or route exits. In such an embodiment, the node may not specifically parse the multicast address and/or inspect the payload of the first data. In other embodiments, the node can be configured to extract a key from a randomness field of the first multicast address and compare the key extracted from the randomness field to group key(s) that were determined to be currently accepted and/or valid, at 530. In some instances, the key extracted from the randomness field of the first multicast address can be directly compared to the currently accepted and/or valid group keys to determine if a match exists. In other instances, the key extracted from the randomness field of the first multicast address can be compared to hash(es) or other transformations of the currently accepted and/or valid group key(s).

At 550, the first data can be forwarded towards members of the multicast group 132, as discussed above with reference to FIG. 1. Similarly stated, the node, having located a next-hop and/or route associated with the first multicast address and/or having validated the first multicast address, the first data can be sent towards members of the multicast group 132.

At 560, second data for routing to the multicast group can be received by the node. The second data can include a second multicast address. The second data can be evaluated at 570, which can be similar to evaluating the first data, at 540, as described above. The second data can be dropped at 580, based on the second multicast address being invalid. For example, a key within a randomness filed of the second multicast address may not match an accepted and/or valid group key. In such an instance, a table (e.g., a routing table or forwarding table) may not include a destination and/or next hop for the second data and/or second multicast address. For example, the second multicast address can be the same as the first multicast address (e.g., the key within the randomness field of the second multicast address can be the same as the key within the randomness filed of the first multicast address), but the second data can be received, at 560, after the first data is received, at 540, and after an accepted and/or valid key based on which the first data was accepted and forwarded has expired, been revoked, or otherwise been depreciated. As another example, the second data can be received, at 560, before or within the same epoch as the first data, but the key within the randomness field of the second multicast address can match a depreciated group key or no group key at all at the time when the second data is received. In such an example, a table (e.g., a routing table or forwarding table) may not include a destination and/or next hop for the second data.

In some embodiments data that is dropped (e.g., based on including an invalid and/or depreciated multicast address) can be logged, analyzed, and/or reported to an administrator device. In this way, each node can serve as a sensor monitoring the status of the multicast network and collect and/or report data indicative of an attack. For example, if one or more nodes receives an unusual amount of data (e.g., an amount of data and/or data received at a frequency that exceeds a predetermined and/or configurable threshold) including invalid or depreciated multicast addresses, it can be indicative of an attack. Similarly stated, an unusual data volume and/or an unusual number of packets over an interval (e.g., predetermined and/or configurable) of time can be indicative of an attack. In response an administrator device monitoring the network can react by, for example, decreasing epoch duration and/or reducing the number of currently accepted epochs/multicast addresses. Similarly stated, an administrator device can send a control signal to one or more nodes to cause such node(s) to decrease epoch duration and/or number of currently accepted epochs/multicast addresses. In addition or alternatively, nodes can be configured to automatically and/or independently decease epoch duration and/or reduce the number of currently accepted epochs/multicast addresses in response to receiving an amount of data that includes invalid and/or depreciated multicast addresses that exceeds a threshold. In this way, the attack surface for the multicast network can be decreased in response to detecting an attack. Furthermore, nodes and/or the administrator device can be operable to analyze data that is sent to invalid and/or depreciated multicast address. For example, pattern recognition, heuristics, deep packet inspection and/or other suitable network analysis techniques can be applied to identify commonalties of dropped traffic. Based on such an analysis, additional filters and countermeasures can be implemented and/or deployed. For example, if inspection of malicious data (e.g., data having invalid and/or depreciated multicast addresses) reveals a fingerprint associated with internet-enabled baby monitors, additional filters can be deployed to drop such data independent of whether it includes an accepted and/or valid multicast address.

While various embodiments have been described above, it should be understood that they have been presented by way of example only, and not limitation. Although various embodiments have been described as having particular features and/or combinations of components, other embodiments are possible having a combination of any features and/or components from any of embodiments where appropriate. For example, FIG. 1 describes a multicast network 100 including discrete routers 122, destinations 130, and a source 110. It should be understood, however, that in some instances, for example, in a mesh network, a node can be a source, a router, and/or a destination simultaneously and/or situationally. In addition, FIG. 1 depicts a single source and a single multicast group 132. It should be understood, however, that any number of sources can send data to any number of multicast groups via a multicast network 100. Additionally, a compute entity can be a source of some multicast data and a recipient of other multicast data. As another example, some embodiments describe "data packets." It should be understood that a data packet refers to any suitable unit of data and includes datagrams and/or other suitable data payloads.

Where methods described above indicate certain events occurring in certain order, the ordering of certain events may be modified. Additionally, certain of the events may be performed repeatedly, concurrently in a parallel process when possible, as well as performed sequentially as described above.

Some embodiments described herein relate to processors and/or memory. A processor can be a general purpose processor, a Field Programmable Gate Array (FPGA), an Application Specific Integrated Circuit (ASIC), a Digital Signal Processor (DSP), and/or the like. Memory can be for example, a random access memory (RAM), a memory buffer, a hard drive, a database, an erasable programmable read-only memory (EPROM), an electrically erasable read-only memory (EEPROM), a read-only memory (ROM) and/or so forth. In some embodiments, the memory 414 stores instructions to cause the processor 412 to execute modules, processes and/or functions.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

What is claimed is:

1. A non-transitory processor readable medium storing code representing instructions configured to be executed by a processor, the code comprising code to cause the processor to:
receive first data addressed to a first multicast address, the first multicast address including a first randomness field containing a first group key associated with a group of destination nodes and a first time period;
perform a calculation on at least one shared secret to determine a first accepted group key associated with the first time period;
determine a current time period;
forward the first data to the group of destination nodes in response to the first group key matching the first accepted group key and the first time period being less than a threshold number of time periods before the current time period;
receive second data addressed to a second multicast address, the second multicast address including a second randomness field containing a second group key associated with the group of destination nodes and associated with a second time period;
perform a calculation on the at least one shared secret to determine a second accepted group key associated with the second time period, the second accepted group key being depreciated at the current time period based on the current time period being more than a threshold number of time periods after the second time period; and
drop the second data based on the second group key matching the second accepted group key and the second group key being depreciated at the current time period.

2. The non-transitory processor readable medium of claim 1, the code further comprising code to cause the processor to send a signal reporting that the second data was dropped to a device having a processor and a memory and associated with an administrator.

3. The non-transitory processor readable medium of claim 1, wherein the first time period, the second time period, and the current time period each have a common predetermined length.

4. The non-transitory processor readable medium of claim 1, wherein the first group key is a value derived from the at least one shared secret, the first multicast address is an internet protocol version six (IPv6) multicast address having the first group key placed into a randomness field within the IPv6 multicast address.

5. The non-transitory processor readable medium of claim 1, the code further comprising code to cause the processor to:
receive an indication of an attack; and
reduce the threshold number of time periods in response to the indication of the attack.

6. The non-transitory processor readable medium of claim 1, the code further comprising code to cause the processor to:
receive, an indication of an attack; and
reduce a length of time associated with the current time period in response to the indication of the attack.

7. The non-transitory processor readable medium of claim 1, wherein the second data is from a plurality of data addressed to the second multicast address, the code further comprising code to cause the processor to:
determine that an attack is in progress based on the plurality of data exceeding a threshold; and reduce a length of time associated with the current time period in response to determining that the attack is in progress.

8. A non-transitory processor readable medium storing code representing instructions configured to be executed by a processor, the code comprising code to cause the processor to:

receive, during a first time period, first data for routing to a group via a first multicast address, the first multicast address based, at least in part on a first group key;

perform a calculation on at least one shared secret to determine a first accepted group key associated with the first time period;

send the first data to the group via the first multicast address in response to the first group key matching the first accepted group key;

receive, during a second time period after the first time period, second data for routing to the group via a second multicast address that is different from the first multicast address, the second multicast address based, at least in part, on a second group key that is different from the first group key;

perform a calculation on the at least one shared secret to determine a second accepted group key associated with the second time period, the second accepted group key different from the first accepted group key;

send the second data to the group via the second multicast address in response to the second group key matching the second accepted group key depreciate, at a first time, the first accepted group key;

receive, during a third time period occurring after the first time, third data for routing to the group via the first multicast address; and drop the third data based on the first multicast address being depreciated before the third time period.

9. The non-transitory processor readable medium of claim 8, the code further comprising code to cause the processor to:

perform, during the third time period after the second time period, a calculation on the at least one shared secret to determine an accepted group key associated with the group and the third time period.

10. The non-transitory processor readable medium of claim 8, the code further comprising code to cause the processor to:

receive, an instruction to update the second accepted group key;

depreciate the second accepted group key;

perform, in response to receiving the instruction to update the second accepted group key, a calculation on the at least one shared secret to determine a third accepted group key;

receive, at a second time, fourth data for routing to the group via the second multicast address, the second time being after the third accepted group key is determined and after the second accepted group key is depreciated; and drop the fourth data based on the second group key not matching any accepted group key at the second time.

11. The non-transitory processor readable medium of claim 8, the code further comprising code to cause the processor to:

receive, at a second time after the second time period, an instruction to remove a node from the group; and perform, at a third time after the second time, a calculation on the at least one shared secret to determine a third accepted group key associated with the third time period and disassociated with the node;

receive, during the third time period, fourth data for routing to the group via a third multicast address based, at least in part on the third group key that is different from the first group key and the second group key; and send the third data to the group and not to the node via a third multicast address in response to the third group key matching the third accepted group key.

12. An apparatus, comprising:

an input port configured to receive a plurality of data packets for distribution to a group, each data packet from the plurality of data packets including a multicast address from a plurality of multicast addresses;

a processor operatively coupled to the input port, the processor configured to:

calculate, at a first time from a plurality of times, a first group key from a plurality of group keys, the first group key calculated based on a first shared secret, the first group key associated with the group and a first time period;

calculate, at a predetermined time after the first time, a second group key from the plurality of group keys, the second group key calculated based on a second shared secret, the second group key associated with the group and a second time period;

manage the plurality of group keys such that at any time from the plurality of times at least one accepted group key exists, the at least one accepted group key being from the plurality of group keys;

compare at least a portion of each multicast address from the plurality of multicast addresses to a value determined based on an accepted group key from the at least one accepted group key;

monitor a frequency with which the multicast address from the plurality of multicast addresses received at the input port does not match the at least one accepted group key; and send an indication of an attack to a compute device associated with an administrator when the frequency exceeds a predetermined threshold; and an output port operatively coupled to the processor, the output port configured to send a first data packet from the plurality of data packets to the group, the first data packet including a first multicast address from the plurality of multicast addresses, the output port configured to send the first data packet to the group in response to the processor indicating that a portion of the first multicast address is associated with the group and matches the value determined based on the accepted group key from the at least one accepted group key.

13. The apparatus of claim 12, wherein the second shared secret is based on the first group key.

14. The apparatus of claim 12, wherein the first shared secret is the second shared secret.

15. The apparatus of claim 12, wherein the output port is configured to send the data packet to the group via a plurality of intermediate multicast routers.

16. The apparatus of claim 12, wherein the first group key is an accepted group key from a second time from the plurality of times to a third time from the plurality of times, a period between the second time and the third time being predetermined.

17. The apparatus of claim 12, wherein the processor is configured to:
   receive an indication of a duration for which a group key from the plurality of group keys is an accepted group key; and
   manage the plurality of group keys such that the first group key is an accepted group key from a second time from the plurality of times to a third time from the plurality of times, a period between the second time and the third time equaling the duration.

18. The apparatus of claim 12, wherein:
   the accepted group key is a first accepted group key;
   the input port is configured to receive a second data packet from the plurality of data packets for distribution to the group from a sender node; and
   the processor is configured to assign a second multicast address to the second data packet by binding a value calculated based on a second accepted group key from the at least one accepted group key to a randomness field of an internet protocol version six (IPv6) multicast address such that the second multicast address is associated with the group.

19. The apparatus of claim 12, wherein, the processor is further configured to:
   reduce a number of group keys that are accepted group keys in response to the frequency exceeding the predetermined threshold.

\* \* \* \* \*